United States Patent [19]

Kobayashi et al.

[11] Patent Number: 4,785,685

[45] Date of Patent: Nov. 22, 1988

[54] RACK GUIDE OF SYNTHETIC RESIN FOR A RACK AND PINION TYPE STEERING DEVICE

[75] Inventors: Nobuo Kobayashi, Toyota; Shigeo Aiba, Aichi; Shigetoshi Miyoshi, Toyota; Takahiro Iwase, Anjo; Tsutomu Sugiura; Takeshi Onogi, both of Toyota; Taisuke Nakamura, Okazaki, all of Japan

[73] Assignee: Toyota Jidosha Kabushiki Kaisha, Toyota, Japan

[21] Appl. No.: 36,451

[22] Filed: Apr. 9, 1987

[30] Foreign Application Priority Data

Apr. 9, 1986 [JP] Japan .................. 61-052072[U]
Jul. 9, 1986 [JP] Japan .................. 61-104283[U]
Mar. 13, 1987 [JP] Japan .................. 62-035956[U]

[51] Int. Cl.$^4$ .................. B62D 3/12; F16H 19/04
[52] U.S. Cl. .................. 74/498; 74/422; 74/424.6
[58] Field of Search .................. 74/498, 422, 424.6

[56] References Cited

U.S. PATENT DOCUMENTS

| | | | |
|---|---|---|---|
| 431,203 | 7/1890 | Dittridge | 52/738 |
| 3,623,379 | 11/1971 | Bradshaw et al. | 74/422 |
| 3,844,182 | 10/1974 | Bradshaw et al. | 74/422 |
| 4,263,816 | 4/1981 | Adams | 74/422 |
| 4,322,986 | 4/1982 | Adams et al. | 74/422 |
| 4,400,991 | 8/1987 | Breitweg et al. | 74/498 |
| 4,593,578 | 6/1986 | Kobayashi et al. | 74/498 |
| 4,683,769 | 8/1987 | Mochizuki et al. | 74/498 |

FOREIGN PATENT DOCUMENTS

| | | | |
|---|---|---|---|
| 961379 | 1/1975 | Canada | 74/498 |
| 2748011 | 11/1978 | Fed. Rep. of Germany | 74/422 |
| 691677 | 12/1959 | Italy | 52/738 |
| 57171965 | 4/1956 | Japan . | |
| 59216764 | 6/1959 | Japan . | |
| 67162 | 4/1984 | Japan | 74/422 |

*Primary Examiner*—Leslie A. Braun
*Assistant Examiner*—Scott Anchell
*Attorney, Agent, or Firm*—Oblon, Fisher, Spivak, McClelland & Maier

[57] ABSTRACT

The synthetic resin rack guide to be housed in a gear box of a rack and pinion type steering device for a vehicle. The rack guide includes a generally semi-cylindrical head, an outer cylinder and an inner cylinder. The generally semi-cylindrical head includes a semi-cylindrical concave surface which slidably contacts a back surface of a rack bar. The outer cylinder is separated from the inner cylinder by a circumferentially extending space and is divided into a plurality of sections in the circumferential direction by a plurality of slits which extend in parallel with an axis of the rack guide. Due to the provision of the slits, the outer cylinder can shrink radially inward when it is inserted into a rack housing with no clearance between them and when an interference between them is increased in proportion to an increase in ambient temperature. Thus, a locking of the rack guide with the rack housing is prevented and a smooth sliding is obtained even with the increase in ambient temperature.

7 Claims, 4 Drawing Sheets

RACK GUIDE OF SYNTHETIC RESIN FOR A RACK AND PINION TYPE STEERING DEVICE

BACKGROUND OF THE INVENTION

1. Field of the Invention

The present invention relates to a rack guide of synthetic resin which is housed in a steering gear box of a rack and pinion type steering device of a vehicle for transforming rotations of a steering shaft around its axis into right and left movements of a tie rod.

2. Description of the Prior Art

A conventional rack and pinion type steering device is disclosed in Japanese Utility Model Publication SHO 57-17196. In this publication, as shown in FIGS. 7 and 8, a pinion 102 connected to a steering shaft side member and a rack bar 104 connected to a tie rod side member have teeth which are mesh-engaged with each other, whereby rotations of the steering shaft are converted to right and left movements of a tie rod. The rack bar 104 moves reciprocally inside a housing 106 and is slidably supported by a rack guide 108 which is positioned opposite to the pinion 102. The rack guide 108 is slidably inserted within the housing 106 and is pushed toward the pinion 102 by a spring 112 which is interposed between the rack guide 108 and a plug 110.

Functions of the rack guide 108 are to push the rack bar 104 against the pinion 102 with such a suitable preload as to insure the mesh-engagement between the pinion 102 and the rack bar 104 and to suppress rolling of the rack bar 104, which may otherwise occur due to the manufacturing tolerances of the meshing teeth, during the right and left movements of the rack bar 104.

Conventionally, a sintered rack guide has been mainly used. However, with the sintered rack guide, there has been a problem of noises being generated due to a jittering of the rack guide, such jittering arising due to the clearance between the sintered rack guide and the housing.

Japanese Patent Publication SHO 59-216764 discloses a noise suppressing structure. As shown in FIGS. 9 and 10, the rack guide 114 of SHO 59-216764 incorporates in a wall of the rack guide a pair of spaces 116 and 118 extending in a circumferential direction whereby the wall of the rack guide 114 is divided into an inner cylinder 124 and an outer cylinder 126 which are connected to each other at two positions 120 and 122 in the circumferential direction of the rack guide. In the rack guide 114, the outer cylinder 126 continuously extends over the entire circumference of the rack guide. The outer cylinder 126 is manufactured in a shape of ellipse and is inserted into the housing 128 so that a clearance between the rack guide and the housing is made zero.

Another noise suppressing structure is disclosed in the previously-mentioned Japanese Utility Model Publication SHO 57-17196. Referring again to FIGS. 7 and 8, the rack guide 108 of SHO 57-17196 includes a single cylindrical wall 130 in which a slit 132 extending in an axial direction is formed. Owing to the slit 132, the rack bar supporting surface 134 of the rack guide 108 can be spread to decrease a clearance between the housing 106 and the rack guide, thereby suppressing the generation of noises.

However, in the above-mentioned noise suppressing structures, there still remain the following problems.

Though the rack guide 114 of SHO 59-216764 has excellent noise suppression effects, the rack guide 114 has the defect that the interference between the rack guide 114 and the housing 128 increases in proportion to an increase in the ambient temperature due to the thermal expansion differences between the two so that, in a worst case, the rack guide 114 locks with the housing 128. In such a locking state, a steering load of a driver will be increased when the locking has occurred during a time when the rack guide is strongly pushed against the rack bar and, conversely, noises will be caused when the locking has occurred during a time when the rack guide is away from the rack bar.

Recently, the space in the engine room of a vehicle has been designed small for the purpose of making it compact. Therefore, the rack guide is often exposed to high ambient temperatures and the above-mentioned locking raises a severe problem.

In the rack guide 108 of SHO 57-17196, since the rack bar supporting surface 134 itself is spread, axial movement of the rack guide 108 due to manufacturing tolerances of the teeth of the rack and the pinion can not be absorbed, although a radial clearance between the rack guide 108 and the housing 106 becomes zero. As a result, smooth rotation of the pinion 102 and smooth rotation of the steering wheel can not be obtained.

SUMMARY OF THE INVENTION

An object of the present invention is to provide a rack guide of synthetic resin in which sliding between the rack guide and a housing can be assured even if the interference between the rack guide and the housing is increased due to the thermal expansion differences between the two and in which such sliding can be achieved without being accompanied by a substantial distortion of a semi-cylindrical head of the rack guide for supporting a rack bar, and so without being accompanied by a deterioration in the rack bar supporting characteristics of the rack guide.

The above-mentioned object can be carried out by a rack guide of synthetic resin to be housed in a steering gear box for a rack and pinion type steering device according to the present invention.

The rack guide comprises a generally semi-cylindrical head, an outer cylinder, and an inner cylinder.

The generally semi-cylindrical head has a semi-cylindrical concave surface which has an axis extending at a right angle with respect to an axis of the rack guide and slidably pushes a cylindrical back surface of a rack bar in an axial direction of the rack guide.

The outer cylinder is connected at a radially outer portion of the generally semi-cylindrical head and extends away from the generally semi-cylindrical head in the direction of concavity of the head and in parallel with the axis of the rack guide. The outer cylinder includes a plurality of slits which extend along the axis of the rack guide so that the slits divide the outer cylinder in a circumferential direction of the rack guide.

The inner cylinder is connected at a radially inner portion of the generally semi-cylindrical head and extending away from the generally cylindrical head in parallel with the axis of the rack guide. The inner cylinder defines, in cooperation with the outer cylinder, a circumferentially extending space which extends over an entire circumference around the axis of the rack guide between the inner cylinder and the outer cylinder.

Since the rack guide of the present invention has the outer cylinder with the slits, an outer cylinder can shrink in the radial direction and the radial shrinkage can absorb an increase of the interference between the rack guide and the housing whereby stable sliding with small axial loads can be assured even under severe temperature conditions. In addition, since the absorption of the increase in the interference is substantially performed by only the outer cylinder, that is, not by the generally semi-cylindrical head, and since the generally semi-cylindrical head is increased in rigidity by provision of the inner cylinder, the shape of the semi-cylindrical surface of the generally semi-cylindrical head will not be changed and thus, stable sliding of the rack bar and stable pushing of the rack guide will be maintained.

BRIEF DESCRIPTION OF THE DRAWINGS

The above and other objects, features and advantages of the present invention will be become apparent and more readily appreciated from the following detailed description of the preferred exemplary embodiments of the invention taken in conjunction with the accompanying drawings, in which.

DETAILED DESCRIPTION OF THE PREFERRED EMBODIMENTS

Figure 6:
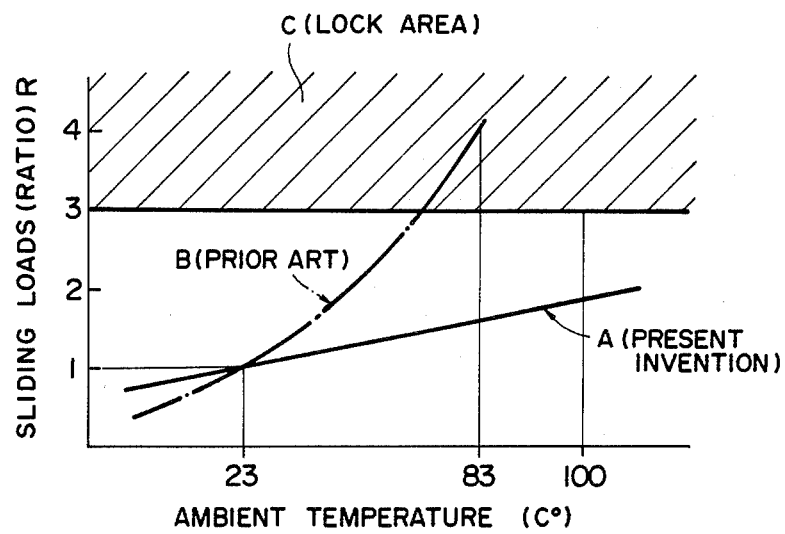
FIG. 6. is a graph showing the relationship between ambient temperature and sliding forces of the rack guide of FIG. 1.
Figure 4:
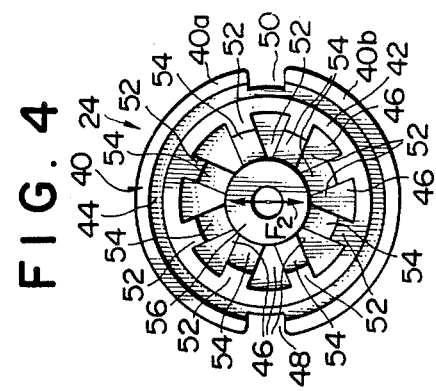
FIG. 4 is a bottom plan view of the rack guide of FIG. 1.
Figure 5:
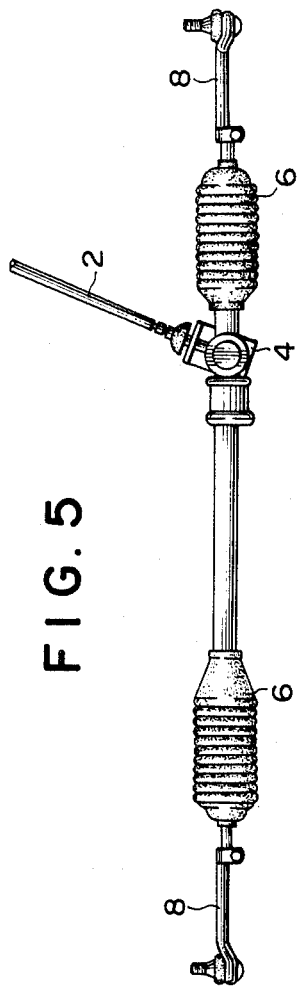
FIG. 5 is a side view of a steering device including the rack of FIG. 1.

FIGS. 1 to 5 illustrate one preferred embodiment of the present invention and FIG. 6 illustrates the characteristics thereof. In FIG. 5, rotation of a steering shaft 2 around its axis is converted, via a gear box 4, to right and left movements of a tie rod 8 which penetrates a rack housing 6.

Figure 1:
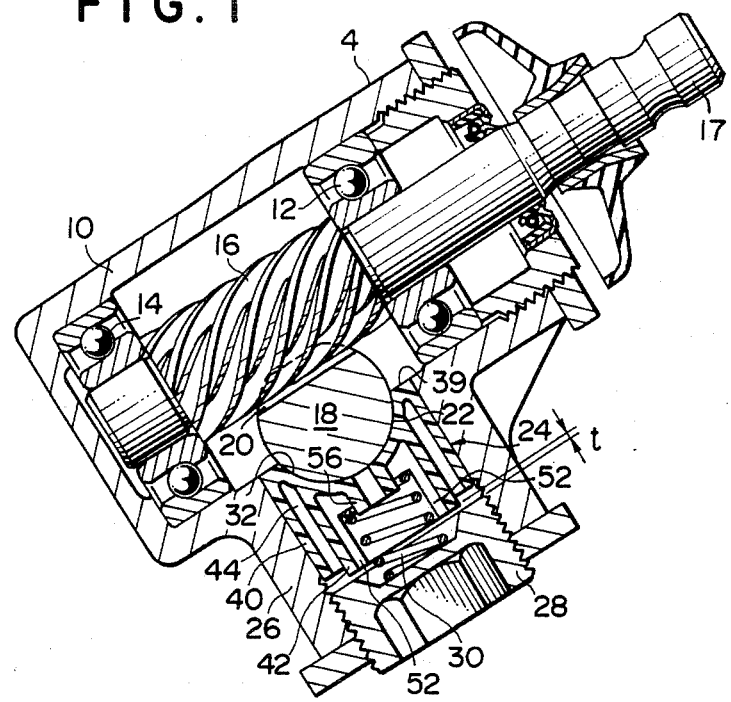
FIG. 1 is a sectional view of a gear box structure of a rack and pinion type steering device housing a rack guide according to one embodiment of the present invention.

FIG. 1 shows the structures inside the gear box 4. In the housing 10 thereof, a pinion 16 is rotatably supported by bearings 12 and 14. A shaft portion 17 of the pinion 16 protrudes out through the housing 10 and is coupled with the steering shaft 2. The pinion 16 meshes rack teeth 20 formed in a rack bar 18 which is offset from the pinion 16 and extends at a right angle with respect to an axis of pinion 16. The rack bar 18 is movable in the axial direction thereof. The rack bar 18 penetrates the rack housing 6 and is connected to the tie rod 8.

A back surface of the rack bar 18 opposite to the rack teeth 20 is formed in a semi-cylindrical surface 22. The rack bar 18 is slidably supported by a rack guide 24 which is positioned opposite to the pinion 16. The rack guide 24 is slidably housed in a cylindrical portion 26 of the housing 10, an axis of which extends at a right angle with respect to the axis of the pinion 16. A plug 28 is threaded into an end portion of the cylindrical portion 26 of the housing 10 by a distance such that a certain clearance t is formed between the rack guide 24 and the plug 28. A compressed coil spring 30 is interposed between the rack guide 24 and the plug 28. In response to the spring force from the spring 30, the rack guide 24 pushes the rack bar 18 against the pinion 16 and creates a suitable engagement with no back-lash. The clearance t is provided for the purpose of suppressing a so-called shimmy. The shimmy is absorbed by a compression distortion of the coil spring 30 because such a distortion is allowed by the clearance t.

Figure 2:
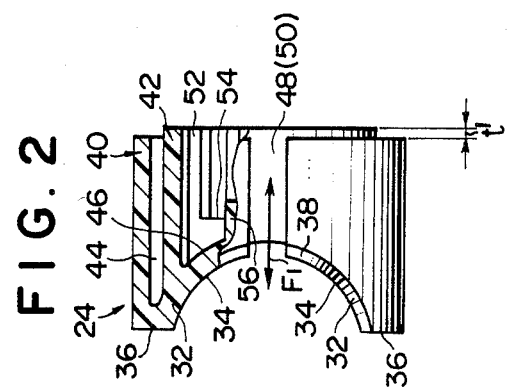
FIG. 2 is an elevational and partial sectional view of the rack of FIG. 1.
Figure 3:
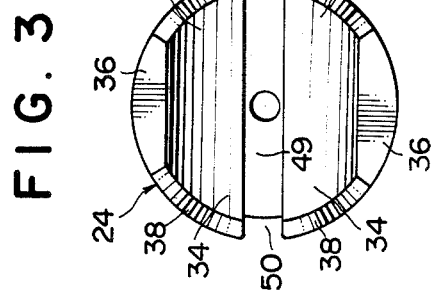
FIG. 3 is a top plan view of the rack guide of FIG. 1.

The rack guide 24 is formed of synthetic resin. Such a synthetic resin comprises a straight chain synthetic resin selected from polyacetal and nylon. As shown in FIGS. 2 to 4, the rack guide 24 includes a generally semi-cylindrical head 32 having a semi-cylindrical surface 34. The semi-cylindrical surface 34 is formed in the same shape as that of the semi-cylindrical back surface 22 of the rack bar 18 and slidably contacts the semi-cylindrical back surface 22 of the rack bar 18. The axis of the semi-cylindrical surface 34 of the generally cylindrical head 32 extends at a right angle with respect to the axis of the rack guide 24. The generally semi-cylindrical head 32 further includes, at an outer portion thereof, a pair of flat portions 36 and another pair of faceted portions 38. The flat portions 36 which are positioned on both sides of the rack bar 18 extend in the plane which is at a right angle with respect to the axis of the rack guide 24 and extend, as shown in FIG. 1, in the generally same plane as an inside surface 39 of a pinion housing portion of the housing 10. The faceted portions 38 which are flush with the semi-cylindrical surface 34 at their edges of contact therewith are tapered away from the back surface 22 of the rack bar 18. Such a taper makes sliding of the rack guide 24 with respect to the rack bar 18 smooth.

The rack guide 24 includes an outer cylinder 40 which connects to a radially outer portion of the generally semi-cylindrical head 32 and extends away from the generally semi-cylindrical head 32 in the direction of concavity of the head 32 and in parallel with the axis of the rack guide 24. The rack guide 24 further includes an inner cylinder 42 which connects to a radially inner portion of the generally semi-cylindrical head 32 and extends away from the generally semi-cylindrical head 32 in parallel with the axis of the rack guide 24. The inner cylinder 42 is positioned radially inside of the outer cylinder 40.

A circumferentially extending space 44 is formed between the outer cylinder 40 and the inner cylinder 42. The circumferentially extending space 44 is opened in the direction away from the generally semi-cylindrical head 32. The circumferentially extending space 44 ends at the back surface 46 of the generally semi-cylindrical head 32 in the direction toward the generally semi-cylindrical head 32. The circumferentially extending space 44 extends over the entire circumference around the axis of the rack guide 24 and completely separates the outer cylinder 40 from the inner cylinder 42. Thus, the outer cylinder 40 and the inner cylinder 42 are independent from each other.

A plurality of slits which divide the outer cylinder 42 into a plurality of sections in the circumferential direction of the rack guide 24 are formed in the outer cylinder 40. The slits each extend along the axis of the rack guide 24 and comprise, for example, a pair of slits 48 and 50. The pair of slits 48 and 50 are positioned so that each axis of the slits 48 and 50 extending in the axial direction of the rack guide 24 coincides with the rack bar 18, and preferably coincides with the longitudinal axis of the rack bar 18 in the axial direction of the rack guide 24. The slits 48 and 50 divide the outer cylinder 40 into two generally semicircular portions 40a and 40b. The slits 48 and 50 extend over the entire length of the outer cylinder 40 and are connected by a groove 49 extending across the surface 34. Thus, the previously mentioned faceted portions 38 are cut by the plurality of slits 48 and 50. Due to the provision of the plurality of slits 48 and 50, the outer cylinder 42 made of synthetic resin can shrink in the circumferential direction and in the radial direction of the rack guide 24 while decreasing the width of the slits 48 and 50. The housing 10 is made of metal, more specifically of aluminum or an aluminum alloy. Therefore, when the ambient temperature becomes high, the interference between the rack guide 24 and the housing 10 is increased due to the thermal expansion differences between the rack guide 24 and the housing 10. However, since the outer cylinder 40 of the rack guide 24 made of synthetic resin can elastically deform due to the slits 48 and 50, sliding characteristics of the rack guide 24 with respect to the housing 10 are not injured.

The inner cylinder 42 extends further away from the generally semi-cylindrical head 32 than the outer cylinder 40 by an amount of t'. Thus, only the inner cylinder 42 contacts the plug 28 and the outer cylinder 40 does not contact the plug 28, which allows a substantially free shrinking of the outer cylinder 40 without restriction by the plug 28.

The rack guide 24 further includes a plurality of protrusions which protrude radially inward from the inside surface of the inner cylinder 42 and extend in parallel with the axis of the rack guide 24. The protrusions comprise, for example, ribs 52. The rack guide 24 further includes a plurality of spring seats which are positioned inside of the inner cylinder 42. Each of the plurality of spring seats has the same circumferential width as that of each of ribs 52 and has a spring seat surface 54 for contact by the coil spring 30. The spring seat surfaces 54 are spaced from the back surface 46 of the generally semi-cylindrical head 32. The ribs 52 extend in the axial direction of the rack guide 24 from the spring seat surfaces 54 to the end portion of the inner cylinder 42. The ribs 52 and the spring seats 54 in cooperation with the inner cylinder 42 increase the rigidity of the generally semi-cylindrical head 32 in the axial direction of the rack guide 24. Thus, when the generally semi-cylindrical head 32 receives reaction loads from the rack bar 18, such reaction loads are supported by the inner cylinder 42 reinforced by the ribs 52 and the spring seats as well as by the generally semi-cylindrical head 32 itself.

The rack guide 24 further includes a spring guide 56 which is positioned at a radially central portion of the generally semi-cylindrical head 32 and extends away from the back surface of the generally semi-cylindrical head 32 in the axial direction of the rack guide 24. The spring guide 56 extends further away from the generally semi-cylindrical head 32 than do the spring seat surfaces 54. The end portion of the coil spring 30 is located in an annular space formed between the spring guide 56 and the plurality of ribs 52 and is pressed against the spring seat surfaces 54.

The rack guide 24 is formed of straight chain synthetic resin selected from polyacetal or nylon. The housing 10 which houses the rack guide 24 is formed of aluminum or aluminum alloy.

Figure 11:
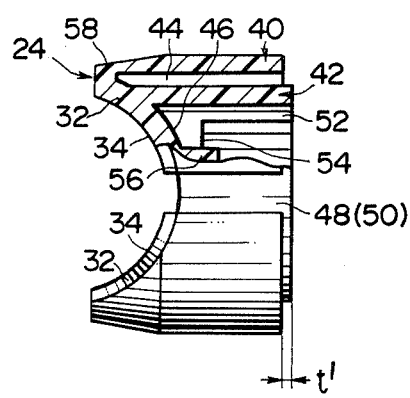
FIG. 11 is a sectional view of a rack guide of another embodiment a to the present invention.
Figure 12:
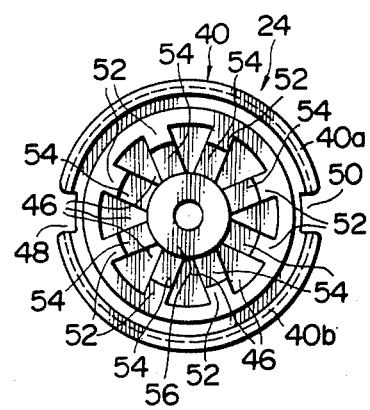
FIG. 12 is a bottom plan view of the rack guide of FIG. 11.

FIGS. 11 and 12 illustrate another embodiment of a rack guide 24A according to the present invention. Explanations for such portions of the rack guide 24A that have the same structures as those of the rack guide 24 will be omitted by attaching the same reference numerals to such portions as those of the rack guide 24. The rack guide 24A has the same structure as that of the previously mentioned rack guide 24 except that the rack guide 24A further includes a taper 58. The taper 58 is provided at an outside surface of the outer cylinder of the rack guide 24A. The taper 58 extends, in the axial direction of the rack guide 24A, from the position which corresponds to the deepest position of the concave semi-cylindrical surface 32a of the generally semi-cylindrical head 32 to the edge of the outer cylinder 40 connected to the generally semi-cylindrical head 32. The taper 58 is so formed that a diameter of the rack guide 24A becomes smaller in a direction toward the end of the connecting edge of the outer cylinder and the generally semi-cylindrical head 32. Such a taper 58 prevents the generally semi-cylindrical head 32 from being brought into a lock contact with the housing 10 when the interferences between the rack guide 24A and the housing 10 become large in proportion to an increase in the ambient temperature. As a result, a stable smooth sliding between the rack guide 24A and the housing 10 can always be assured.

Figure 13:
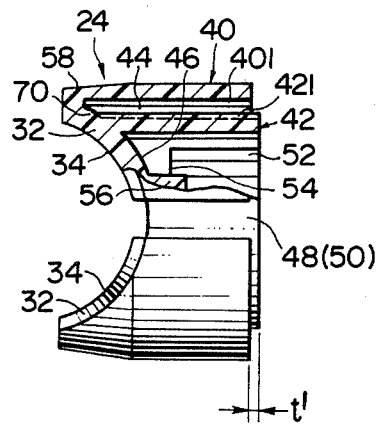
FIG. 13 is a sectional view of a rack guide of yet another embodiment according to the present invention.
Figure 14:
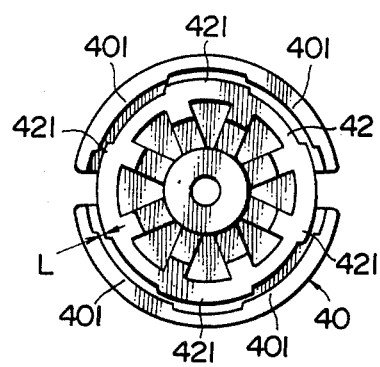
FIG. 14 is a bottom plan view of the rack guide of FIG. 13.

FIGS. 13 and 14 illustrate yet another embodiment of a rack guide 24B according to the present invention. The rack guide 24B has the same structure as that of the rack guide 24A except that the rack guide 24B further includes a plurality of protrusions 421 and/or 401 which radially protrude into the circumferentially extending space 44 from the inside surface of the outer cylinder 40 and/or the outside surface of the inner cylinder 42. Explanations for such portions of the rack guide 24B that have the same structures as those of the rack guide 24A will be omitted by attaching the same reference numerals to such portions as those of the rack guide 24A. The protrusions 421 and/or 401 prevent the outer cylinder 40 from being excessively deformed radially inward by contacting the inner cylinder 40 and/or the outer cylinder 42 and prevent a root portion 70 of the outer cylinder 40 from permanently being deformed. If such a permanent deformation of the root portion 70 of the outer cylinder 40 were to occur, the outer cylinder 40 would be excessively deformed radially inward whereby a jittering of the rack guide 24B might take place.

Figure 15:
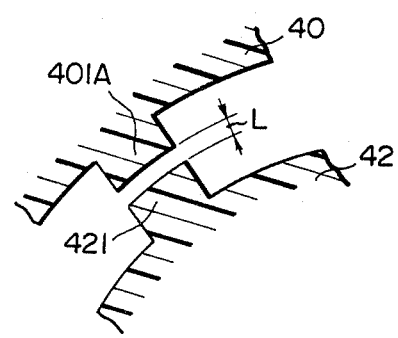
FIG. 15 is a partial bottom view of the rack guide of FIG. 13 showing one modification of protrusions.

In the example of FIG. 14, the protrusions 401 and 421 stagger with each other in the circumferential direction of the rack guide 24B and the circumferential end portions of the protrusions 401 and 421 overlap with each other so that the circumferential end portion of the protrusion 421 contact the circumferential end portion of the protrusion 401 when the outer cylinder 40 deforms radially inward. As shown in FIG. 15, the protrusions 401 and 421 may coincide with each other in the circumferential direction of the rack guide 24B.

Next, operations of the rack guide 24 (which are also applicable to operations of the rack guides 24A and 24B) will be explained.

The steering shaft 2 is rotated around the axis thereof by rotating a steering wheel and rotations of the steering shaft 2 are converted to right and left movements of the rack bar 18 through the mesh-engagement between the pinion 16 and the rack teeth 20 of the rack bar 18 which are housed in the gear box 4.

The rack bar 18 is supported by the rack guide 24 which is pushed by the coil spring 30 and is pushed against the pinion 16. Such pushing absorbs a backlash between the rack bar 18 and the pinion 16. In this instance, a shimmy can be absorbed by the clearance t between the inner cylinder 42 and the plug 28. To let the rack guide 24 perform such operations smoothly, the rack guide 24 is required to slide with little load with respect to the housing 10. However, if a clearance was provided between the outer surface of the rack guide 24 and the inside surface of the housing 10, a jittering of the rack guide 24 would take place. Therefore, such a smooth sliding of the rack guide 24 with respect to the housing 10 is desirably performed under a zero clearance condition between the rack guide 24 and the housing 10.

The rack guide 24 of synthetic resin of the present invention is inserted into the rack housing 10 with an interference between the rack guide 24 and the rack housing 10, that is, with a zero clearance between the rack guide 24 and the rack housing 10. In spite of such a zero clearance, the rack guide 24 can smoothly slide with respect to the rack housing 10, because the outer cylinder 40 has the plurality of slits 48 and 50 and is independent of the inner cylinder 42 due to the circumferentially extending space 44. The outer cylinder 40 can shrink radially inward with accompanying shrinkage in the width of the slits 48 and 50. This means that the rack guide 24 satisfies both the requirements of suppression of noises due to such a clearance and smooth sliding for a stable operation. This also means that the rack guide 24 of the present invention does not require a close manufacturing tolerances and that production costs of the rack guide 24 will be decreased.

Figure 9:
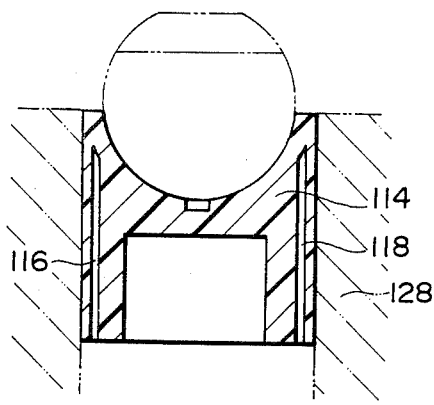
FIG. 9 is a sectional view of the rack guide shown in Japanese P Publication SHO 59-216764.
Figure 10:
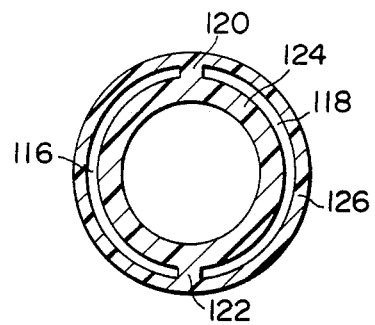
FIG. 10 is a sectional view of the rack guide of FIG. 9.

The interference between the rack guide 24 and the housing 10 is increased in proportion to an increase in ambient temperature. This is because the thermal expansion coefficient of the synthetic resin of the rack guide 24 is three to five times that of the aluminum of the rack housing 10. The increase in the interference would conventionally increase the sliding loads of the rack guide 24 with respect to the rack housing 10. However, according to the present invention, the provision of the plurality of slits 48 and 50 lets the outer cylinder 40 easily be deformed radially inward and thus the increase in the sliding loads will be suppressed to a great extent. On the contrary, since the conventional rack guide 114 of FIGS. 9 and 10 does not have such slits, the outer cylinder 126 can not shrink radially inward and thus the sliding loads will be increased to a great extent.

FIG. 6 illustrates relationship between the ambient temperature T° C. and the increasing load ratios R. In the Figure, R=1 corresponds to a sliding load when the ambient temperature is 23° C. Usually, the sliding force under the ambient temperature of 23° C. is desirably in the range of 5 to 10 Kg and the load of 5 to 10 Kg is determined as an interference required to prevent a jittering of the rack guide 24. A spring force of the coil spring 30 is set in the range of 20 to 30 Kg by adjusting the plug 28. The spring force of the coil spring 30 of 20 to 30 Kg is determined taking it into consideration that the spring 30 can slide the rack guide 24 with respect to the rack housing 10 while overcoming the sliding load of the rack guide 24, that the back lash between the pinion 16 and the rack bar 18 can be absorbed, and that a shimmy can be prevented.

The ambient temperatures T°]C. around the rack guide 24 is usually increased to 83° C. under engine operating conditions, and may be increased up to 100° C. in more recently designed vehicles. The sliding load (which is shown by a curve B in the FIG. 6) of a conventional rack guide (FIGS. 9 and 10) may then increase to a ratio of more than 3 and enter the area C which is shown by multiple oblique lines in FIG. 6. In such an area C the sliding loads of the conventional rack guide exceed the spring force of 20 to 30 Kg of the coil spring 30 and the conventional rack guide is brought into a lock contact with the housing. On the other hand, according to the present invention, since the outer cylinder 40 can shrink radially inward, an increase in the sliding loads (which is shown by a curve A in FIG. 6) is suppressed to a small amount and the rack guide 24 does not enter the locking area C. Thus, smooth sliding is maintained.

Figure 7:
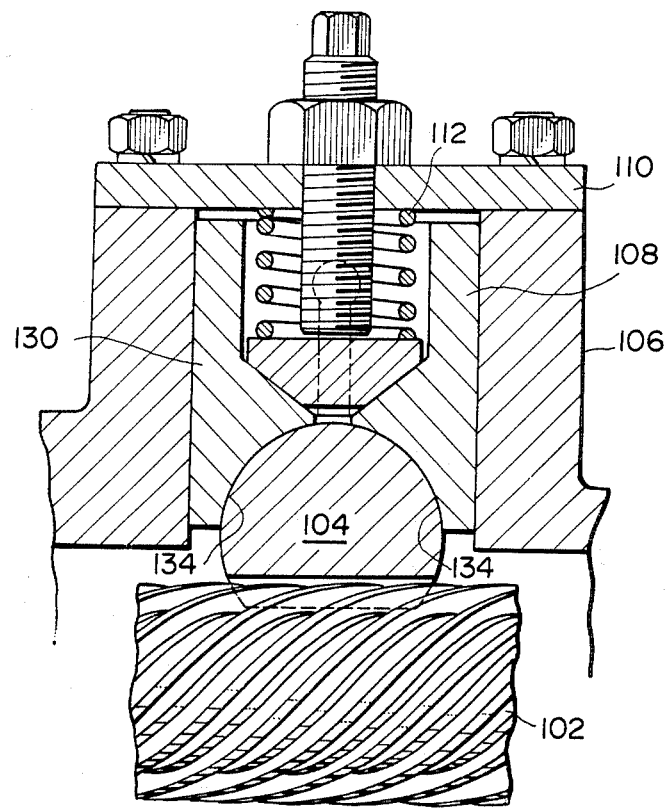
FIG. 7 is a sectional view of the rack guide shown in the Japanese Utility Model Publication SHO 57-171965.
Figure 8:
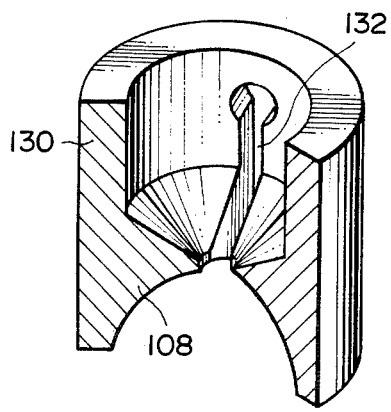
FIG. 8 is a partial oblique view of the rack guide of FIG. 7

Since the generally semi-cylindrical head 32 is reinforced by the inner cylinder 42 and the ribs 52, the generally semi-cylindrical head 32 can support the reaction forces from the rack bar 18 and the pushing forces of the coil spring 30 without being excessively deformed. The shrinking deformation of the outer cylinder 40 does no substantially affect the generally semi-cylindrical head 32. On the other hand, in the conventional rack guide 130 of FIGS. 7 and 8 which has only one cylindrical wall, a deformation of the wall will directly cause a deformation of the sliding surface 134.

In addition, since the slits 48 and 50 are provided at positions which are at a right angle with respect to a direction of the reaction force (which is shown by a reference $F_2$ in FIGS. 4 and therefore the portions 40a and 40b of the outer cylinder 40 are positioned along the axis of the pinion reaction force $F_2$, the outer cylinder 40 can effectively prevent the rack guide 24 from jittering.

As will be easily understood from the above explanations, the following effects can be obtained according to the present invention. A smooth sliding between the rack guide 24 and the rack housing 10 can be maintained even when the interference between the rack guide 24 and the rack housing 10 is increased due to an increase in ambient temperatures, and such a smooth sliding can be performed without deforming the generally semi-cylindrical head 32.

Further, in the case where the taper 58 is provided at the outside surface of the rack guide 24A, prevention of locking of the sliding will be more satisfactorily performed.

Furthermore, in the case where the protrusions 401 and/or 421 of the rack guide 24B are provided, the permanent deformation of the root 70 of the outer cylinder 40 is prevented and thus the durability of the rack guide 24B can be improved.

Although only a few exemplary embodiments of the present invention have been described in detail above, those skilled in the art will readily appreciate that many modifications are possible in the exemplary embodiments without materially departing from the novel teachings and advantages of the invention. Accordingly, all such modifications are intended to be included within the scope of the present invention as defined in the following claims.

What is claimed is:

1. A synthetic resin rack guide to be housed in a steering gear box for a rack and pinion type steering device, comprising:

a generally semi-cylindrical head having a concave semi-cylindrical surface which has an axis, and positionable in a steering gear box for slidably pushing a semi-cylindrical back surface of a rack bar;

an outer cylinder connected at a radially outer portion of said generally semi-cylindrical head and extending away from said generally semi-cylindrical head at a right angle with respect to said axis of said generally semi-cylindrical head to define a rack guide axis coincident with an axis of said outer cylinder, said outer cylinder including a plurality of slits which extend along said axis of the rack guide, said slits dividing said outer cylinder in a circumferential direction of the rack guide;

an inner cylinder connected at a radially inner portion of said generally semi-cylindrical head in parallel with said outer cylinder, said inner cylinder defining, in cooperation with said outer cylinder, a circumferentially extending space between said cylinders which extends over an entire circumference of said rack guide;

a plurality of ribs protruding radially inwardly from an inside surface of said inner cylinder and extending in parallel with said axis of said rack guide in the axial direction of the rack guide, a spring seat formed integrally with said generally semi-cylindrical head and positioned radially inside of said inner cylinder, wherein said spring seat may receive a pushing force from a coil spring which pushes said rack guide toward a pinion housed in the gear box; and a spring guide which is formed integrally with said generally semi-cylindrical head and is positioned at a radially central portion of said generally semi-cylindrical portion, said spring guide extending away from said generally semi-cylindrical head and protruding from a seat surface of the spring seat away from said generally semi-cylindrical head, wherein said plurality of the ribs continuously extend from a seat surface of the spring seat to an end portion of said inner cylinder.

2. The rack guide according to claim 1 wherein said plurality of slits comprise a pair of slits which are positioned symmetrical to each other with respect to said axis of said rack guide.

3. The rack guide according to claim 1 wherein said inner cylinder extends further away from the generally semi-cylindrical head than does said outer cylinder.

4. The rack guide according to claim 1 wherein said rack guide is formed of straight chain synthetic resin selected from the group consisting of polyacetal and nylon.

5. A synthetic resin rack guide to be housed in a steering gear box for a rack and pinion type steering device, comprising:

a generally semi-cylindrical head having a concave semi-cylindrical surface which has an axis, and positionable in a steering gear box for slidably pushing a semi-cylindrical back surface of a rack bar;

an outer cylinder connected at a radially outer portion of said generally semi-cylindrical head and extending away from said generally semi-cylindrical head at a right angle with respect to said axis of said generally semi-cylindrical head to define a rack guide axis coincident with an axis of said outer cylinder, said outer cylinder including a plurality of slits which extend along said axis of the rack guide, said slits dividing said outer cylinder in a circumferential direction of the rack guide;

an inner cylinder connected at a radially inner portion of said generally semi-cylindrical head and extending away from said generally semi-cylindrical head in parallel with said outer cylinder, said inner cylinder defining, in cooperation with said outer cylinder, a circumferential extending space between said cylinders which extends over an entire circumference of said rack guide; and a taper formed in an outer surface of said outer cylinder, said taper extending, in said axial direction of said rack guide, from a position which corresponds to a bottom of said concave semi-cylindrical surface to an edge of said outer cylinder connected to said generally semi-cylindrical head, said taper being so formed that a diameter of said rack guide becomes smaller in a direction toward said edge of said outer cylinder.

6. The rack guide according to claim 5 including at least one protrusions formed integrally with least one of the outer cylinder and the inner cylinder, at least one protrusion radially protruding into said circumferentially extending space.

7. As synthetic resin rack guide to be housed in a steering gear box for a rack and pinion type steering device, comprising:

a generally semi-cylindrical head having a concave semi-cylindrical surface which has an axis, and positionable in a steering box for slidably pushing a semi-cylindrical back surface of a rack bar;

an outer cylinder connected at a radially outer portion of said generally semi-cylindrical head and extending away from said generally semi-cylindrical head at a right angle with respect to said axis of said generally semi-cylindrical head to define a rack guide axis coincident with an axis of said outer cylinder, said outer cylinder including a plurality of slits which extend along said axis of the rack guide, said slits dividing said outer cylinder in a circumferential direction of the rack guide;

an inner cylinder connected at a radially inner portion of said generally semi-cylindrical head and extending away from said generally semi-cylindrical head in parallel with said outer cylinder, said inner cylinder defining, in cooperation with said outer cylinder, a circumferentially extending space between said cylinders which extends over an entire circumference of said rack guide; and a plurality of protrusions formed on both of said outer cylinder and inner cylinder and protruding into said circumferentially extending space, said protrusions formed on said outer cylinder overlapping with at least one portion of the protrusions formed on said inner cylinder in the circumferential direction of said rack guide.

* * * * *